United States Patent [19]

Suzuki et al.

[11] 4,001,492

[45] Jan. 4, 1977

[54] HALF TONE REPRODUCING PROCESS IN FACSIMILE

[75] Inventors: Matsumi Suzuki; Toshi Itoh, both of Tokyo, Japan

[73] Assignee: Fuji Xerox Co., Ltd., Tokyo, Japan

[22] Filed: Feb. 6, 1973

[21] Appl. No.: 330,071

[30] Foreign Application Priority Data

Feb. 8, 1972 Japan ............................ 47-13317

[52] U.S. Cl. .................................. 358/283; 178/6; 178/6.7 R
[51] Int. Cl.² ........................................ H04N 1/38
[58] Field of Search .......... 178/6.6 R, 6.6 B, 6.7 R, 178/6, 7.1, 7.3, 5

[56] References Cited

UNITED STATES PATENTS

| | | | |
|---|---|---|---|
| 2,263,986 | 11/1941 | Finch | 178/6.6 R |
| 2,283,415 | 5/1942 | Cox | 178/6.6 R |
| 3,197,558 | 7/1965 | Ernst | 178/6.6 B |
| 3,564,131 | 2/1971 | Herold et al. | 178/6.7 R |
| 3,580,995 | 5/1971 | Klensch | 178/6.7 R |
| 3,613,103 | 10/1971 | Harris | 178/6.6 R |
| 3,751,587 | 8/1973 | Insler et al. | 178/6.6 R |

*Primary Examiner*—Raymond F. Cardillo, Jr.
*Attorney, Agent, or Firm*—Gerald J. Ferguson, Jr.; Joseph J. Baker

[57] ABSTRACT

A half tone reproducing circuitry in a facsimile system characterized by circuitry for pulse number modulating the image signal of an image including half tone circuitry for eliminating those pulses from the pulse frequency modulated signal occurring during the white portion of the image signal and circuitry for on and off controlling an image recording device by the modulated signal thereby reproducing the half tone of the image.

2 Claims, 7 Drawing Figures

HALF TONE REPRODUCING PROCESS IN FACSIMILE

BACKGROUND OF THE INVENTION

This invention relates to a half tone reproducing circuit in an image recording device of a facsimile system in which the image signal of an image including half tone is pulse frequency modulated, the modulated signal thus obtained being applied to said image recording device to on-and-off control it for reproducing the half tone of the image.

SUMMARY OF THE INVENTION

The object of this invention resides in providing a half tone reproducing circuit in a facsimile system which includes an image recording device for recording the image by controlling an image reproducing medium such as a light beam, electric potential, electric current, or ink or the like with on and off control either solely or with on and off control utilized for simplifying the whole apparatus, in which, the image signal of an image include half tone is pulse frequency modulated those pulses occurring during the white portion of the image signal being eliminated, said recording medium being on and off controlled by the modulated signal, thereby the half tone is reproduced clearly.

BRIEF DESCRIPTION OF THE DRAWING

The drawings shows one embodiment of this invention.

DESCRIPTION OF PREFERRED EMBODIMENT

Figure 1:
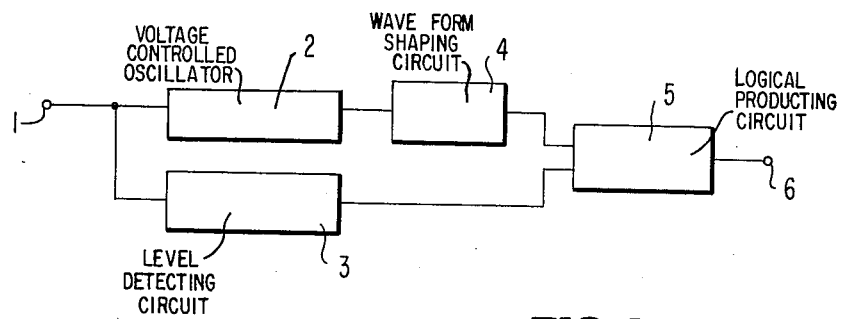
FIG. 1 shows a diagrammatic view of illustrative circuitry in accordance with the invention.
Figure 2:
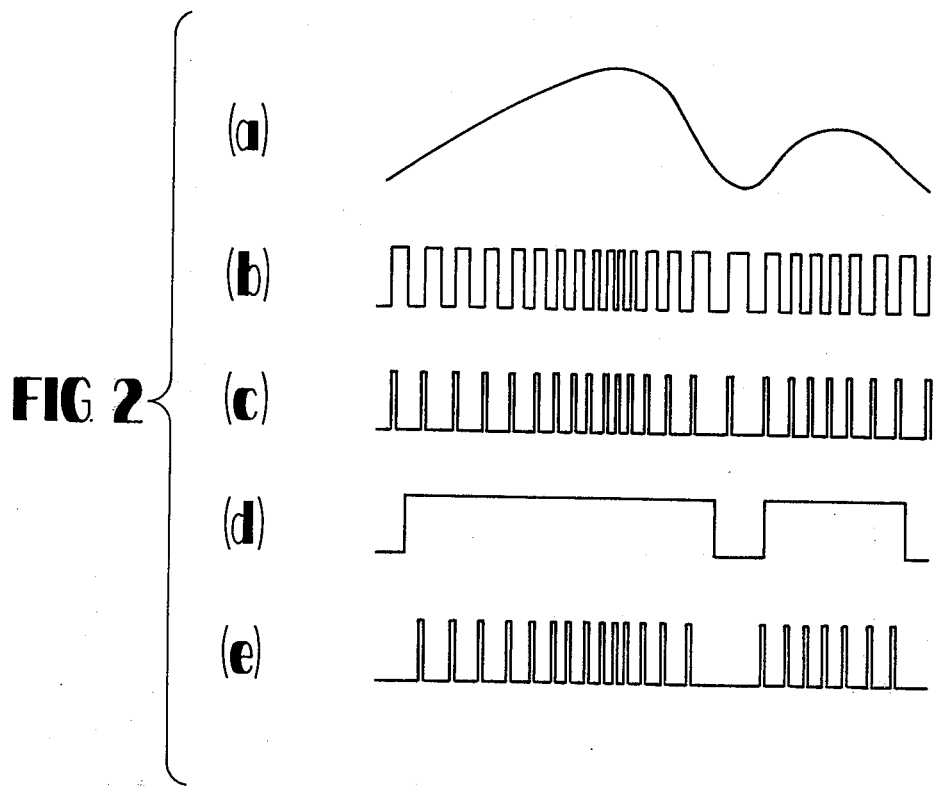
FIG. 2(a) is an illustrative image signal including half tone as applied to terminal (1) of FIG. 1.
FIG. 2(b) is an illustrative pulse width modulated signal produced by circuit (2) of FIG. 1.
FIG. 2(c) is an illustrative pulse frequency modulated signal produced by circuit (4) of FIG. 1.
FIG. 2(d) is an illustrative control signal produced by circuit (3) of FIG. 1.
FIG. 2(e) is an on-off control signal produced by circuit (5) in accordance with this invention.

One embodiment of this invention will now be described, by way of example, with reference to the drawings. In the drawings, 1 is an image signal input terminal. Assuming that an image signal including half tone as shown in FIG. 2(a) is applied to the terminal 1, said signal is applied to a voltage controlled oscillator 2 such as a monostable multivibrator and to the input of a level detecting circuit 3. The image signal is applied to the voltage controlled oscillator 2 and is converted to a rectangular pulse train, (FIG. 2(b)) the frequency of which corresponds to the respective image level, and said pulse train is applied to a wave form shaping circuit 4. The wave form shaping circuit 4 functions to form pulse signals from the input rectangular wave, and comprises, for example, a monostable multivibrator having a high speed differentiation circuit. The signal (FIG. 2(c)) from wave form shaping circuit 4 is applied, together with a "white" level detecting signal (FIG. 2(d)) by the image level detecting circuit 3, to a circuit 5 whereby an output signal does not appear at the output of gate 5 when the image signal is white. Thus, no output can be detected at the output terminal 6 when the input image signal is white, but when the input signal is not white, output pulses are produced and, the frequency of the output pulses increases when the image approaches "black". Therefore, by connecting the output terminal 6 with on and off control circuit of a recording device (not shown), it is possible to reproduce half tone.

As described above, this invention enables reproducing half tone by an on and off control image recording device by pulse frequency modulating the image signal of an image including half tone and on and off controlling the image recording device by the modulated signal. Further, this invention is very easily and economically implemented since adding a very simple circuit is enough to perform this invention.

What is claimed is:

1. Half tone reproducing circuitry in a facsimile system comprising a means for pulse frequency modulating the image signal of an image including half tone, and a pulse eliminating means for eliminating those pulses from the pulse frequency modulated signal occurring during the white portion of the image signal; and a means for applying the output signal from said pulse eliminating means to an image recording device to reproduce the image including half tone, said pulse eliminating means comprising threshold means responsive to said image signal for developing a control signal which is at a first level when said image signal is non-white and at a second level when said image signal is white; and means responsive to the pulse frequency modulated signal and said control signal for eliminating said pulses occurring during said white portion of said image signal when said control signal is at said second level.

2. Facsimile circuitry as in claim 1 including differentiating means responsive to the output signal from said modulating means.

* * * * *